United States Patent Office 2,965,445
Patented Dec. 20, 1960

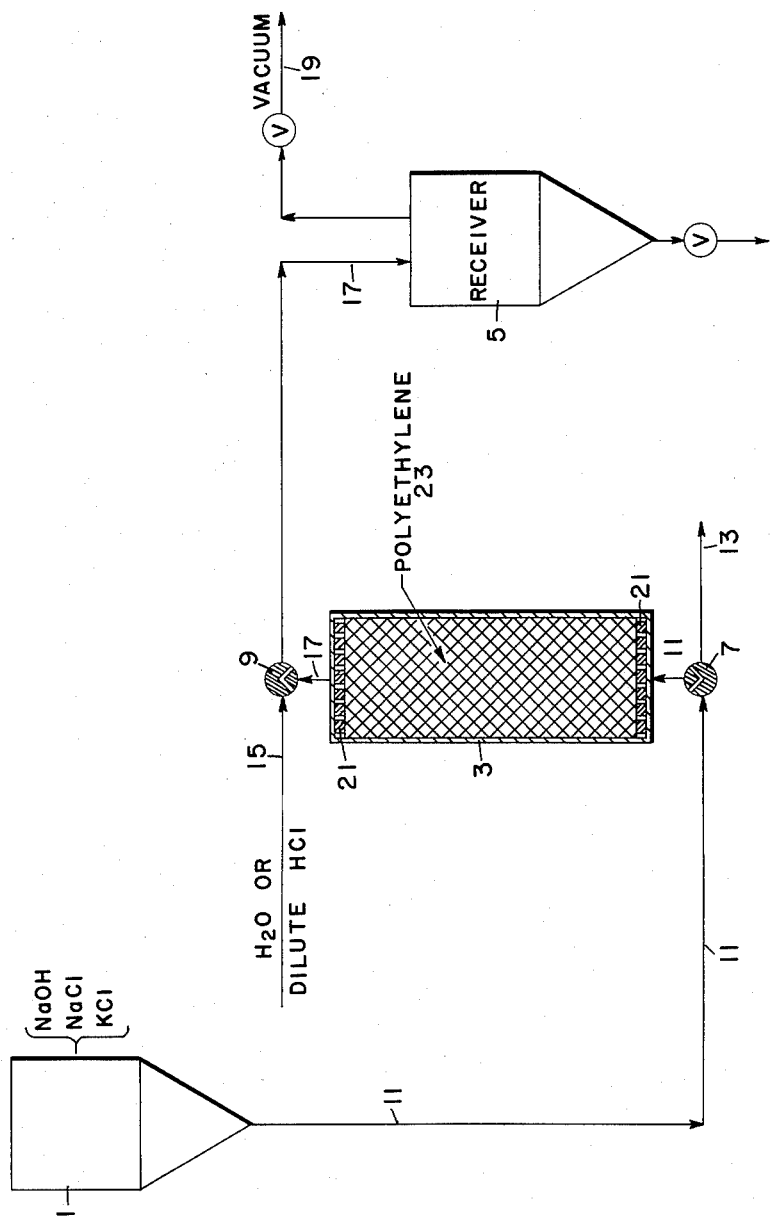

2,965,445

PROCESS FOR PURIFYING ALKALI METAL HYDROXIDE AND ALKALI METAL HALIDE SOLUTIONS

Duane N. Goens and Joseph Adrien M. Le Duc, Painesville, and Christopher C. Silsby, Jr., Euclid, Ohio, assignors to Diamond Alkali Company, Cleveland, Ohio, a corporation of Delaware Filed Feb. 9, 1959, Ser. No. 792,071

11 Claims. (Cl. 23—89)

This invention relates to a method for treating aqueous solutions of alkali metal hydroxides and alkali metal halides, and more partciularly, relates to a method for removing fluorescence and insoluble impurities from aqueous solutions of alkali metal hydroxides and alkali metal halides.

Regarding fluorescence, it has been observed that commercial alkali metal hydroxide soltuions, particularly those which are prepared by the electrolysis of brine solutions in diaphragm cells, often exhibit a yellowish-green fluorescence. Although the cause of this fluorescence is not fully understood, it has been found that alkali metal hydroxide solutions which exhibit fluorescence frequently cause difficulties in processes in which they are used. One example of such a difficulty is the discoloration of cotton fabrics which are mercerized using a caustic soda solution whcih exhibits fluorescence. Additionally, even where the fluorescence of the alkali metal hydroxide solution does not adversely affect the process in which it is used, the color imparted by the fluorescence renders the hydroxide solution unsightly, thus, often making it difficult to sell the alkali metal hydroxides which exhibit this characteristic.

In the past, it has been proposed to remove fluorescence from an alkali metal hydroxide by developing the fluorescence to its maximum intensity and then contacting the hydroxide solution with an oxidizing agent such as air, oxygen, ozone, chlorine, sodium hypochlorite, hypochlorous acid, hydrogen, sodium or potassium peroxide or by contacting the hydroxide solution with a finely-divided solid absorbent such as the alkali metal or alkaline earth metal carbonates or active carbon. However, when using oxidizing agents to remove the fluorescence, several hours, often as many as eight hours, of contact time are required, thus making it difficult to remove the fluorescence in a continuous process. Additionally, inasmuch as it is not possible to reuse the oxidizing agents, additional expense is incurred by the necessity of replenishing the oxidizing agent in each batch of hydroxide solution to be treated. Similarly, when using a finely-divided solid absorbent material to remove the fluorescence, although the time of treatment is generally much shorter, the absorbent material must be replenished frequently, thus adding to the cost of the hydroxide product.

It has also been found that aqueous solutions of alkali metal hydroxides and alkali metal halides contain considerable quantities of suspended solid matter such as carbon, the insoluble salts of calcium and magnesium, and the like. Although these suspended materials may not adversely affect the processes in which the hydroxide or halide solution is used, as with fluorescence, they render the solution unsightly and often make its sale difficult.

In the past, aqueous solutions of an alkali metal hydroxide or an alkali metal halide have been clarified from these suspended impurities by passing the aqueous solution through one of the various well known filtering materials, such as carbon or charcoal, diatomaceous earth or similar compounds. However, when using these types of materials as the filtering media, it is virtually impossible to reactivate the filtering material once it has become contaminated with the suspended material removed from the aqueous solution. Not only does the expense of the frequent replacement of the filtering media make its use undesirable, but, additionally, there is involved the inconvenience of disassembling the filtering apparatus, removing the filtering material, replacing the used filtering material with new and reassembling the apparatus.

It is, therefore, an object of the present invention to provide a process for clarifying and removing fluorescence from aqueous solutions of alkali metal hydroxides and halides and similar solutions, which process utilizes a filtering media which is relatively permanent.

Another object of this invention is to provide a process as described above wherein the filtering media used is easily reactivated without necessitating the disassembly of the apparatus in which it is used.

A further object of the present invention is to provide a method as described above which is readily adaptable to either a continuous or a batch-type of operation.

These and other objects will become apparent to those skilled in the art from the description of the invention which follows.

It is to be understood that as used in the specification and claims, the terms "alkali metal" and "halide" refer, respectively, to the compounds of sodium, potassium, lithium, rubidium and cesium and to the fluorides, chlorides, bromides and iodides. However, because of their low cost and ready availability, primary reference will be nade hereinafter to the compounds of sodium and potassium and to the chlorides.

It has now been found, in the practice of the present invention, that the problems encountered in the prior art clarification of and fluorescence removal from aqueous solutions of alkali metal hydroxides and halides, can be overcome if the filtering media used in such processes consists of finely-divided polyethylene.

The method of the present invention envisions treating an aqueous solution of an alkali metal hydroxide or an alkali metal halide by contacting the aqueous solutions with finely-divided polyethylene. The contact of the aqueous solution of alkali metal hydroxide or alkali metal halide and the finely-divided polyethylene may be effected by adding the finely-divided polyethylene to the aqueous solution and agitating the solution, as for a batch process, or by passing the aqueous solution through a column containing a bed of the finely-divided polyethylene, as for a continuous process.

More particularly, to remove solid suspended material from brine such as an aqueous solution of sodium chloride or potassium chloride or from an aqueous solution of sodium hydroxide, the solution to be clarified is passed through a bed of finely-divided polyethylene, preferably having a particle size of about +20 mesh. Additionally, it has been found, that where the aqueous solution of caustic soda which is to be clarified also contains fluorescence, the fluorescence can be removed by developing the fluorescence of the caustic soda to its maximum intensity prior to passing it in contact with the finely-divided polyethylene. The maximum intensity of the fluorescence is developed by subjectng the caustic soda to the action of light waves having a wave length not greater than 7000 Angstroms. Preferably, the wave lengths of the light waves to which the caustic soda is subjected is about 4000 Angstroms or less. In this manner the aqueous solution of caustic soda is clarified and has the fluorescence removed therefrom in a single operation.

It has further been found, that where it is desired only to remove the fluorescence from an aqueous solution of caustic soda, this may be done by adding finely-divided polyethylene to a batch of aqueous caustic soda and agitating the caustic soda for a period of time sufficient to cause the removal of the fluorescence. This time is generally about 30 minutes. Following the agitation of the caustic soda, it is filtered through any convenient filtering media, so as to remove the suspended particles of polyethylene. In this manner, the fluorescence from the caustic soda solution can be removed in a batch process.

When sufficient quantities of aqueous solution of sodium chloride or sodium hydroxide have contacted the finely-divided polyethylene so that it is no longer effective in removing either fluorescence or suspended solid matter from the aqueous solution, the polyethylene may be reactivated by washing it with water or a dilute acid solution, such as dilute hydrochloric acid. Where the aqueous caustic soda or brine is purified in a continuous process so that the polyethylene is contained as a bed in a column through which the aqueous solution is passed, it can be conveniently reactivated by "back washing" the polyethylene bed. This is done by passing a stream of water or dilute acid through the polyethylene in a direction opposite to that in which the brine or caustic soda solution has been passed, for a period of time sufficient to remove any materials collected on the polyethylene bed. In this manner, in contrast to the prior art methods, the filtering media can be reused almost indefinitely, so the expense of replacement and inconvenience of disassembling the apparatus, necessitated by prior art filtering media, are not encountered.

It has been found, that in the instance of either clarification or fluorescence removal, the aqueous solution to be treated should be in contact with the finely-divided polyethylene for a period of from about 2 to 35 minutes, the shorter time being sufficient for clarification while longer times are generally required for fluorescence removal. These lengths of time have been found to be sufficient to provide substantially complete removal of either suspended solid matter or fluorescence from the aqueous solution. Where the treatment of the aqueous solution is done as a continuous process, the desired amount of contact time can be attained by varying the flow rate of the solution through the polyethylene bed. It is believed that the flow rate needed to provide the desired contact time in apparatus of a particular length and diameter can be readily determined by one skilled in the art in each instance.

Referring now to the drawing, 1 is a tank containing the brine or aqueous solution of caustic soda to be treated, 3 is a column containing the polyethylene filtering agent 23 and 5 is a receiver for the treated brine or caustic soda. The polyethylene 23 is contained within column 3 by means of the perforated plates 21 positioned at each end of column 3. These plates may be of any material which will not be attacked by the aqueous solution used, as for example, polytetrafluoroethylene. In this manner, the solution to be treated can be brought into contact with the finely-divided polyethylene, while the polyethylene is prevented from being carried out of the column by the solution.

In actual operation, the aqueous solution to be treated, in tank 1, is passed into column 3 through line 11, valve means 7 being positioned as to close off line 13. The aqueous solution passes through column 3 in contact with the finely-divided polyethylene 23 at a flow rate which will provide a contact time between the solution and the polyethylene of about 2 minutes for clarification or about 20 minutes for fluorescence removal. From the column 3, the treated solution passes through line 17 to the receiver 5, valve means 9 being positioned so as to close off line 15. Where it is necessary, the flow of the solution through the column may be aided by applying a vacuum to line 19. Similarly, it will be obvious that the solution flow can be aided by a pump placed, for example, in line 11.

When sufficient quantities of solution are passed through the column so that the polyethylene is no longer effective in clarifying or removing the fluorescence from the solution, the flow of solution from tank 1 is stopped, the valve means 7 and 9 are positioned so as to close off lines 11 and 17 respectively, and open lines 13 and 15. The bed 23 of finely-divided polyethylene is then backwashed by passing therethrough a dilute acid solution, such as dilute HCl, which solution is introduced through line 15 and discharges through line 13. In this manner, the polyethylene in the column 3 is reactivated and additional quantities of solution may then be treated without the necessity of replacing the polyethylene material.

Where it is desired to remove fluorescence from an aqueous solution of caustic soda in addition to clarifying the caustic soda, prior to passing the caustic soda solution through the polyethylene-filled column, it is subjected to a source of light having a wave length not in excess of 700 Angstroms for a period of time sufficient to develop the fluorescence of the caustic solution to its full intensity. This light is preferably ultraviolet light, i.e., light having a wave length of 4000 Angstroms or less. The fluorescence of the caustic solution is then removed by passing the solution through the polyethylene-filled column in the manner described above. When sufficient quantities of caustic solution have been passed through the column so that the polyethylene is no longer effective in removing fluorescence, it is reactivated in the same manner as described in relation to clarification.

It is to be understood, that where reference has been made to "finely-divided" polyethylene, it is intended to mean particles of polyethylene which have been shredded or sheared to a particle size of +20 mesh. It has been found that where the finely-divided polyethylene is in pellet or granular form, there is not a sufficient interlacing of the particle to effectively remove either fluorescence or other impurities from the solution which is being treated.

It is, of course, recognized that although the apparatus has been described as comprising a single polyethylene-filled column, a series of such columns may be used, thereby providing an increased area of polyethylene without appreciably increasing the pressure drop. Moreover, if desired, the polyethylene may be contained in a shallow bed, thus obtaining increased surface exposure with no increase in pressure drop. It is believed that other modifications will be apparent to those skilled in the art.

It is to be understood that the term "polyethylene" is intended to include polyethylene having varying molecular weights, such as that in which the molecular weight has been increased, as for example by gamma irradiation, as well as that having a normal molecular weight. The higher molecular weight polyethylenes have been found to be particularly desirable in a commercial operation, in that this material, in the finely-divided state, is not subject to any great change in bulk density under the conditions of use. Hence, it is not packed as tightly in the column as is the lower molecular weight polyethylene.

In order that those skilled in the art may better understand the method of the present invention in a manner which it may be practiced, the following specific examples are given:

Example 1

Apparatus is used similar to that shown in the drawing. The polyethylene column is 33 cm. in length and has an inside diameter of 2.54 cm. 44.5 grams of polyethylene of a particle size of +20 mesh are added to the column. An aqueous solution of 50% caustic soda is subjected to ultraviolet light having a wave length between 2000 and 4000 Angstroms, for a period of about 4 hours. At the expiration of this time, the caustic soda solution emits a very bright yellow-green light fluorescence under the ultraviolet light, indicating that the fluorescence of the caustic soda has been developed to its maximum intensity. The caustic soda solution is then passed through the column containing the finely-divided polyethylene at a flow rate between 13–16 cc. per minute. At this flow rate, the time of contact between the caustic solution and the polyethylene is about 9 minutes. The caustic solution which has passed through the column containing the polyethylene, exhibits no fluorescence upon exposure to the ultraviolet light. A total of 4435 ml. of caustic soda solution are passed through the column before reactivation of the polyethylene in the column is required.

*Example 2*

Using the apparatus of Example 1 through which has been passed 4435 ml. of caustic solution, the column containing the polyethylene is back washed for a period of about 5 minutes, using an aqueous solution containing 1 part of HCl to 10 parts of distilled water. Following the back washing of the column, additional quantities of a 50% aqueous solution of caustic soda are passed through the column which caustic soda has had the fluorescence developed to its greatest intensity as in Example 1. A total of 5250 ml. of caustic solution are passed through the polyethylene in a column before reactivation of the polyethylene is required. The caustic solution passing through the column is found to be completely free of fluorescence.

*Example 3*

Five grams of finely-divided polyethylene having a particle size of +20 mesh, is added to 250 ml. of a 50% aqueous solution of caustic soda in which the fluorescence has been developed to its highest intensity by exposure for a period of 45 minutes to an ultraviolet light having a wave length of between 2000 and 4000 Angstroms. The resulting mixture is agitated for a period of 30 minutes following which time, the mixture is filtered to remove the polyethylene. The resulting caustic solution upon exposure to ultraviolet light is found to be completely free of fluorescence.

*Example 4*

Using the apparatus of Example 1, 1000 ml. of a 50% aqueous solution of caustic soda are passed through the polyethylene-filled column at a flow rate which provides a 2 minute contact time between the solution and the polyethylene. Prior to passing the caustic soda solution through the column, it is very cloudy and has a deep green color. After passing through the polyethylene-filled column, the caustic solution is crystal clear and has a light green color.

*Example 5*

Using the apparatus and procedures of Example 4, 1000 ml. of a 50% aqueous solution of caustic soda made in a mercury cell are passed through the polyethylene-filled column at a flow rate to provide a contact time between the polyethylene and the caustic soda solution of about 2 minutes. The caustic solution is analyzed for mercury content prior to filtration and found to contain 1.6 p.p.m. of mercury. After filtration the caustic solution is found to contain only 0.5 p.p.m. of mercury and the polyethylene is seen to be coated with a light gray material. Following filtration, the caustic soda is crystal clear.

*Example 6*

Using the procedure and apparatus of Example 4, 500 ml. of a saturated sodium chloride solution are passed through the polyethylene-filled column. The flow rate of the sodium chloride solution through the polyethylene is adjusted so as to maintain a contact time of the solution with polyethylene of about 2 minutes. Two runs using 500 ml. of saturated sodium chloride solution are made, one at room temperature (70° F.) and the other at 150° F. In both runs, before filtration, the brine is cloudy and rust colored. After passing through the polyethylene in each instance, the brine is clear and colorless.

*Example 7*

Using the apparatus and procedure of Example 4, 500 ml. of a saturated aqueous solution of potassium chloride is passed through the column containing the finely-divided polyethylene. The rate of flow of the potassium chloride solution is adjusted so that the time of contact between the solution and the polyethylene in the column is about 3 minutes. Two runs are made using 500 ml. of saturated potassium chloride solution in each run, the first run being at room temperature (70° F.), and the second run is at 150° F. Prior to passing the polyethylene, the potassium chloride brine is cloudy gray containing a large amount of suspended carbon. After passing through the polyethylene, in both runs, the potassium chloride brine is crystal clear and has a light yellow color.

*Example 8*

Using the polyethylene-filled columns of Examples 4, 6 and 7, through which has been filtered an aqueous solution of caustic soda, a saturated sodium chloride solution and a saturated potassium chloride solution, respectively, additional quantities of the respective solution are passed through each column until a total of 5 liters of caustic solution, 5 liters of sodium chloride brine and 5 liters of potassium chloride brine have been passed through the respective columns. At this point, sufficient quantities of impurities have been collected on the polyethylene in the respective columns so that the polyethylene is no longer effective in removing the suspended impurities from the respective solutions. The three columns are then reactivated by backwashing with a solution containing 10 parts of water and 1 part HCl for a period of about 5 minutes. An additional 5 liters each of the 50% aqueuos solution of caustic soda, the saturated sodium chloride brine and the saturated potassium chloride brine are passed through the respective polyethylene-filled column before reactivation of the polyethylene is again required.

*Example 9*

Using apparatus similar to that shown on the drawing, with the exception that four columns, each 4 feet in length and 2 inches in diameter, arranged in series so that the solution from the top of one passes into the bottom of the next, a total of 35 gallons of 50% aqueous NaOH are passed through the columns. The columns are packed with shredded polyethylene having a particle size of +20 mesh. The NaOH solution is exposed to ultraviolet light having a wave length between 2000 and 4000 Angstroms for a period of 10 days prior to passing it through the columns. The fluorescence of the NaOH solution is seen to be fully developed at the expiration of this time. The NaOH solution is passed through the columns over a period of 35 hours at a flow rate of one gallon per hour. The NaOH solution which has been passed through the column exhibits no fluorescence upon exposure to ultraviolet light. Upon exposing the column containing the polyethylene to ultraviolet light, it is seen to be fluorescent for only about two-thirds of the length of the first column, thus showing that the polyethylene has not been completely exhausted.

From the above examples, it is seen that the finely-divided polyethylene is effective in removing both fluorescence and suspended impurities from the aqueous solutions which are treated. Additionally, it is seen that the polyethylene is readily reactivated without the necessity of disassembling the apparatus, the reactivation being done by the simple expedient of backwashing with a dilute acid solution.

Although the present invention has been described with particular emphasis to the use of finely-divided polyethylene in removing fluorescence or suspended impurities from aqueous solutions of alkali metal hydroxides and alkali metal halides, it will be appreciated that finely-divided polyethylene can also be used as a filtering media to remove suspended solid impurities from other solutions, the only requirement being that the solution does not attack or in some other manner adversely effect the polyethylene.

While there have been described various embodiments of the invention, the methods described are not intended to be understood as limiting the scope of the invention as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A method of treating aqueous solutions of alkali metal hydroxides and alkali metal halides so as to remove therefrom fluorescence or finely-divided solid matter which comprises contacting said aqueous solutions with finely-divided polyethylene for a period of time sufficient to remove said fluorescence or finely-divided solid matter.

2. A method of removing fluorescence from an aqueous solution of an alkali metal hydroxide which comprises developing the fluorescence of the said aqueous solution to its maximum intensity and contacting said aqueous solution with finely-divided polyethylene.

3. The method as claimed in claim 2 wherein the aqueous solution is passed through a bed of finely-divided polyethylene.

4. The method as claimed in claim 2 wherein finely-divided polyethylene is added to the aqueous solution and agitated therewith for a period of time sufficient to remove the fluorescence from the aqueous solution.

5. A method of removing finely-divided suspended solid material from an aqueous solution selected from the group consisting of alkali metal hydroxides and alkali metal halides which comprises passing said aqueous solution through a bed of finely-divided polyethylene.

6. A method of removing finely-divided suspended solid matter from an aqueous solution of an alkali metal halide which comprises passing said aqueous solution through a bed of finely-divided polyethylene.

7. The method as claimed in claim 2 wherein the alkali metal hydroxide is sodium hydroxide.

8. The method as claimed in claim 6 wherein the alkali metal halide is sodium chloride.

9. The method as claimed in claim 6 wherein the alkali metal halide is potassium chloride.

10. The method as claimed in claim 5, wherein the aqueous solution is an aqueous solution of an alkali metal hydroxide.

11. The method as claimed in claim 10, wherein the alkali metal hydroxide is sodium hydroxide.

References Cited in the file of this patent

UNITED STATES PATENTS

| | | |
|---|---|---|
| 2,191,411 | Pierce | Feb. 20, 1940 |
| 2,282,294 | Coey | May 5, 1942 |
| 2,855,282 | Cox et al. | Oct. 7, 1958 |

UNITED STATES PATENT OFFICE
CERTIFICATION OF CORRECTION

Patent No. 2,965,445                            December 20, 1960

Duane N. Goens et al.

It is hereby certified that error appears in the above numbered patent requiring correction and that the said Letters Patent should read as corrected below.

Column 4, line 22, for "of 700" read -- of 7000 --; column 6, line 16, after "passing" insert -- through --.

Signed and sealed this 20th day of June 1961.

(SEAL)
Attest:

ERNEST W. SWIDER                                    DAVID L. LADD

Attesting Officer                                        Commissioner of Patents